(12) United States Patent
Horiguchi

(10) Patent No.: US 10,354,470 B2
(45) Date of Patent: Jul. 16, 2019

(54) IMAGE SENSOR UNIT, IMAGE READING APPARATUS, IMAGE FORMING APPARATUS, AND PAPER SHEET DISTINGUISHING APPARATUS

(71) Applicant: CANON COMPONENTS, INC., Kodama-gun, Saitama (JP)

(72) Inventor: Tomoyuki Horiguchi, Saitama (JP)

(73) Assignee: CANON COMPONENTS, INC., Saitama (JP)

(*) Notice: Subject to any disclaimer, the term of this patent is extended or adjusted under 35 U.S.C. 154(b) by 0 days.

(21) Appl. No.: 15/562,502

(22) PCT Filed: Mar. 28, 2016

(86) PCT No.: PCT/JP2016/059866
§ 371 (c)(1),
(2) Date: Sep. 28, 2017

(87) PCT Pub. No.: WO2016/158840
PCT Pub. Date: Oct. 6, 2016

(65) Prior Publication Data
US 2018/0096553 A1    Apr. 5, 2018

(30) Foreign Application Priority Data

Apr. 1, 2015 (JP) ................... 2015-075297

(51) Int. Cl.
*G07D 7/121* (2016.01)
*G02B 5/22* (2006.01)
(Continued)

(52) U.S. Cl.
CPC ............ *G07D 7/121* (2013.01); *G02B 5/208* (2013.01); *G02B 5/22* (2013.01); *G07D 7/1205* (2017.05); *H04N 1/028* (2013.01); *H04N 1/19* (2013.01)

(58) Field of Classification Search
CPC ........ G07D 7/12; G07D 7/1205; G07D 7/121; H04N 1/00846; H04N 1/00875;
(Continued)

(56) References Cited

U.S. PATENT DOCUMENTS 5,434,901 A * 7/1995 Nagai ................. G21K 7/00
378/206
5,471,281 A * 11/1995 Hayashi ............ G03G 21/046
250/271

(Continued)

FOREIGN PATENT DOCUMENTS

| JP | H10040436 A | 2/1998 |
| JP | 2002230618 A | 8/2002 |

(Continued)

OTHER PUBLICATIONS

International Preliminary Report on Patentability issued in Intl. Appln. No. PCT/JP2016/059866 dated Oct. 12, 2017.

(Continued)

*Primary Examiner* — Aklilu K Woldemariam
(74) *Attorney, Agent, or Firm* — Rossi, Kimms & McDowell LLP

(57) ABSTRACT

An image sensor unit (60) includes: a light source part (25) that emits at least ultraviolet light in a main-scan direction to an object to be illuminated; a light condenser (32) that focuses light from the object to be illuminated; an image sensor (75) that converts the light focused by the light condenser (32), into an electric signal; and an ultraviolet cut part (65) that is disposed between the object to be illuminated and the image sensor (75), cuts off ultraviolet light in light reflected by the object to be illuminated, and allows fluorescent light to transmit therethrough. The image sensor (75) includes an ultraviolet detection part (77) that detects light in the ultraviolet light emitted from the light source part (25), the detected light having been reflected by a reflecting (Continued)

part but having not transmitted through the ultraviolet cut part (65).

16 Claims, 12 Drawing Sheets

(51) Int. Cl.
| | |
|---|---|
| *H04N 1/028* | (2006.01) |
| *H04N 1/19* | (2006.01) |
| *G07D 7/1205* | (2016.01) |
| *G02B 5/20* | (2006.01) |

(58) Field of Classification Search
CPC ............. H04N 2209/046; H04N 5/332; H04N 5/3692; H04N 9/045; H04N 1/00013; H04N 1/00031; H04N 1/00045; H04N 1/0005; H04N 1/00063; H04N 1/00087; H04N 1/0009; H04N 1/02835; H04N 1/0318; H04N 1/12; H04N 1/193; H04N 2201/03112; H04N 2201/03125; H04N 2201/03129; H04N 2201/03141; H04N 2201/03145; H04N 2201/0315; H04N 2201/03183; H04N 5/2353; H04N 5/2256; H04N 5/33; H04N 1/486; H04N 1/00862; H04N 1/00864; H04N 1/00867; H04N 1/028; H04N 1/40056; H04N 1/02895; H04N 1/04; H04N 1/19; H04N 1/2034; H04N 1/488; H04N 2201/02493; H04N 2005/2255; H04N 5/23212; H04N 5/2354; G01J 2003/2806; G01J 2003/2813; G01J 3/2803; G01J 3/32; G01J 3/36; G01J 3/51; G01J 1/04; G01J 1/0437; G01J 1/047; A61B 1/00009; A61B 1/0638; A61B 1/00163; A61B 1/043; A61B 1/045; A61B 1/06; A61B 1/0646; A61B 1/0661; A61B 5/0071; A61B 5/0084; A61B 5/14552; A61B 5/1455; A61B 5/14532; A61B 5/0073; A61B 5/14539; A61B 5/14546; A61B 1/00082; A61B 1/00149; A61B 1/00156; A61B 1/00181; A61B 1/00186; A61B 1/0019; A61B 1/00193; A61B 1/041; A61B 1/0653; A61B 2560/0214; A61B 2560/0219; A61B 2560/0252; A61B 2560/0418; A61B 2562/0238; A61B 2562/12; A61B 3/0025; A61B 3/0058; A61B 3/10; A61B 3/1241; A61B 3/16; A61B 3/185; A61B 5/0002; A61B 5/0059; A61B 5/0077; A61B 5/01; A61B 5/031; A61B 5/073; A61B 5/14507; A61B 5/14555; A61B 5/1459; A61B 5/1486; A61B 5/18; A61B 5/205; A61B 5/412; A61B 5/415; A61B 5/416; A61B 5/418; A61B 5/4255; A61B 5/445; A61B 5/4839; A61B 5/6814; A61B 5/6861; A61B 6/425; A61B 6/4258; A61B 6/482; A61B 6/508; A61B 6/5247; A61B 8/06; A61B 8/12; A61B 8/4416; A61B 8/56; G03G 21/046; G06T 1/00; G01N 2021/6463; G01N 2021/6493; G01N 21/6456; G02B 5/22; G02B 13/06; G02B 23/243; G02B 3/14; A61F 9/0017; A61F 9/0026; A61M 13/003; G02C 7/04; G06F 19/00; Y02A 90/26
USPC ................. 348/164, 234; 600/109, 160, 476
See application file for complete search history.

(56) References Cited

U.S. PATENT DOCUMENTS

| | | | | |
|---|---|---|---|---|
| 5,724,152 | A | * | 3/1998 | Hayashi .................. G07D 7/12 347/241 |
| 5,747,796 | A | * | 5/1998 | Heard ...................... G02B 6/06 250/227.2 |
| 5,749,830 | A | * | 5/1998 | Kaneko ............... A61B 1/00082 348/E5.038 |
| 2002/0198928 | A1 | * | 12/2002 | Bukshpan ......... B01L 3/502761 709/200 |
| 2004/0129893 | A1 | * | 7/2004 | Usami .................... G07D 7/121 250/461.1 |
| 2005/0001912 | A1 | * | 1/2005 | Hoshuyama ........... H04N 9/045 348/272 |
| 2005/0099513 | A1 | * | 5/2005 | Ishibashi .............. H04N 5/2353 348/234 |
| 2006/0178565 | A1 | * | 8/2006 | Matsui ............... A61B 1/00009 600/160 |
| 2010/0102234 | A1 | * | 4/2010 | Hamasaki ............. G07D 7/121 250/341.7 |
| 2011/0149057 | A1 | * | 6/2011 | Beck .................. A61B 1/00057 348/65 |
| 2011/0299104 | A1 | * | 12/2011 | Seo .......................... G01J 3/02 358/1.9 |
| 2012/0154876 | A1 | | 6/2012 | Shimoda |
| 2012/0212619 | A1 | * | 8/2012 | Nagamune ........... H04N 5/2256 348/164 |
| 2013/0088603 | A1 | * | 4/2013 | Pawlik ..................... H04N 5/33 348/164 |
| 2013/0313516 | A1 | * | 11/2013 | David .................... H01L 33/50 257/13 |
| 2014/0232903 | A1 | * | 8/2014 | Oshima ................ H04N 5/3532 348/229.1 |
| 2014/0267672 | A1 | * | 9/2014 | Morrison ........... G01N 21/6458 348/79 |
| 2015/0065837 | A1 | * | 3/2015 | Abreu .................. A61B 3/1241 600/383 |
| 2015/0381909 | A1 | * | 12/2015 | Butte ..................... H04N 5/332 348/68 |
| 2018/0096553 | A1 | * | 4/2018 | Horiguchi ............. G02B 5/208 |

FOREIGN PATENT DOCUMENTS

| | | |
|---|---|---|
| JP | 2012146285 A | 8/2012 |
| JP | 2012190253 A | 10/2012 |
| JP | 2013258496 A | 12/2013 |

OTHER PUBLICATIONS

English translation of Written Opinion issued in Intl. Appln. No. PCT/JP2016/059866 dated Jun. 7, 2016, cited in IDS filed on Sep. 28, 2017.
International Search Report issued in Intl. Appln. No. PCT/JP2016/059866 dated Jun. 7, 2016. English translation provided.
Written Opinion issued in Intl. Appln. No. PCT/JP2016/059866 dated Jun. 7, 2016.

\* cited by examiner

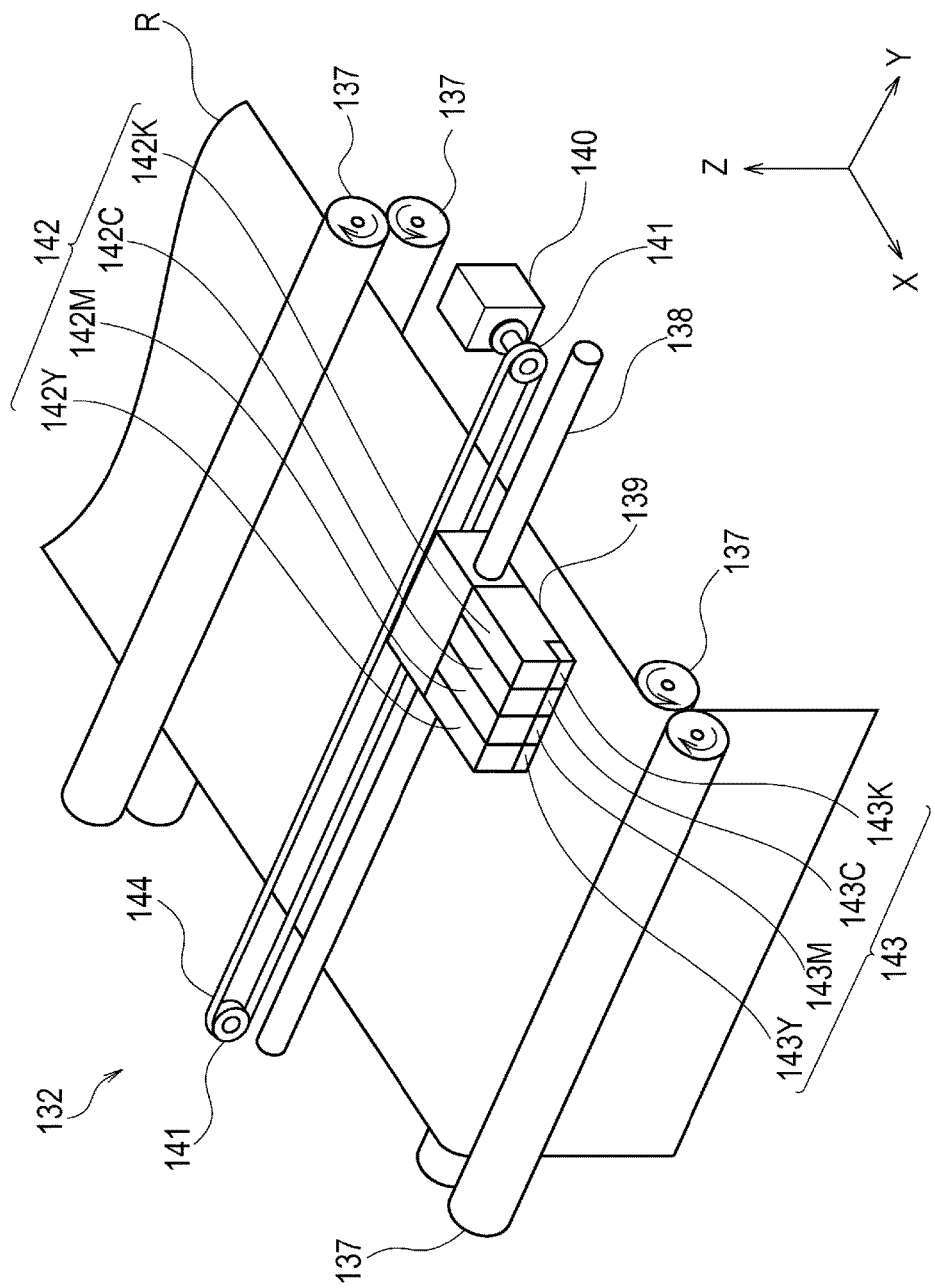

IMAGE SENSOR UNIT, IMAGE READING APPARATUS, IMAGE FORMING APPARATUS, AND PAPER SHEET DISTINGUISHING APPARATUS

TECHNICAL FIELD

The present invention relates to an image sensor unit, an image reading apparatus, an image forming apparatus, and a paper sheet distinguishing apparatus.

BACKGROUND ART

Paper sheets, such as bills and securities, include sheets on which fluorescent images applied with fluorescent ink or the like for authentication are formed. Irradiation of such a paper sheet with ultraviolet light causes the fluorescent image to emit light. Accordingly, the paper sheet can be authenticated through reading the light-emitting fluorescent image.

Patent Literature 1 discloses an optical line sensor device that includes an ultraviolet light LED light source to read a fluorescent image. In the optical line sensor device in Patent Literature 1, a filter that cuts off visible light having wavelengths of 410 nm or less and ultraviolet light is disposed between an object to be illuminated and an image sensor, thereby improving the capability of detecting the fluorescent image.

CITATION LIST

Patent Literature

Patent Literature 1: Japanese Laid-open Patent Publication No. 2012-190253

SUMMARY OF INVENTION

Technical Problem

The ultraviolet light LED light source included in the optical line sensor device as in Patent Literature 1 has an irradiation intensity that decreases owing to deterioration with age and the like. Reduction in irradiation intensity, in turn, reduces the luminance of a read image. Accordingly, the irradiation intensity of the ultraviolet light LED light source is required to be corrected so as to cancel the reduction in irradiation intensity due to deterioration with age.

Typically, an image sensor unit that includes a light source that emits visible light, emits light toward what is called a white reference, causes the image sensor to detect light reflected by the white reference, and corrects the irradiation intensity of the light source according to the intensity of the detected reflected light.

Unfortunately, in the case where the filter that cuts off the visible light having wavelengths of 410 nm or less and ultraviolet light is disposed between the object to be illuminated and the image sensor as with Patent Literature 1, the ultraviolet light reflected by the white reference is cut off by the filter. Consequently, the image sensor cannot detect the ultraviolet light reflected by the white reference. Therefore, there is a problem in that the irradiation intensity of the light source that emits ultraviolet light cannot be corrected.

The present invention has been made in view of the above-described problem, and has an object to provide an image sensor unit and the like that can correct the irradiation intensity of a light source part that emits ultraviolet light.

Solution to Problem

The image sensor unit according to the present invention includes: a light source part that emits at least ultraviolet light in a main-scan direction to an object to be illuminated; a light condenser that focuses light from the object to be illuminated; an image sensor that converts the light focused by the light condenser, into an electric signal; and an ultraviolet cut part that is disposed between the object to be illuminated and the image sensor, cuts off ultraviolet light in light reflected by the object to be illuminated, and allows fluorescent light to transmit therethrough, the fluorescent light having been caused from a fluorescent material irradiated with ultraviolet light, this material being applied on the object to be illuminated, wherein the image sensor includes an ultraviolet detection part that detects light in the ultraviolet light emitted from the light source part, the detected light having been reflected by a reflecting part but having not transmitted through the ultraviolet cut part.

An image reading apparatus according to the present invention includes: the above-described image sensor unit; and a conveyance part that relatively conveys the image sensor unit and the object to be illuminated with respect to each other.

An image forming apparatus according to the present invention includes: the image sensor unit; a conveyance part that relatively conveys the image sensor unit and the object to be illuminated with respect to each other; and an image forming part that forms an image read by the image sensor unit, on a recording medium.

A paper sheet distinguishing apparatus according to the present invention includes: the above-mentioned image sensor unit; a conveyance part that conveys a paper sheet as the object to be illuminated; a storing part that stores reference data serving as a reference for distinguishing the paper sheet; and a comparing part that compares image information read by the image sensor unit with the reference data stored in the storing part, and distinguishes the paper sheet.

Advantageous Effects of Invention

The present invention can correct the irradiation intensity of the light source part that emits ultraviolet light.

BRIEF DESCRIPTION OF DRAWINGS

FIG. 12 is a perspective view showing an image forming part in the image forming apparatus.

DESCRIPTION OF EMBODIMENTS

Hereinafter, preferred embodiments of an image sensor unit, an image reading apparatus, an image forming apparatus, and a paper sheet distinguishing apparatus according to the present invention are described with reference to the drawings. In the following description, three-dimensional directions are indicated by respective X, Y and Z arrows. The X-direction is a main-scan direction. The Y-direction is a sub-scan direction that is perpendicular to the main-scan direction. The Z-direction is a perpendicular direction (vertical direction).

First Embodiment

An image reading apparatus 100 according to this embodiment functions as a paper sheet distinguishing apparatus that authenticates a paper sheet, such as a bill, security and so on.

Figure 1:
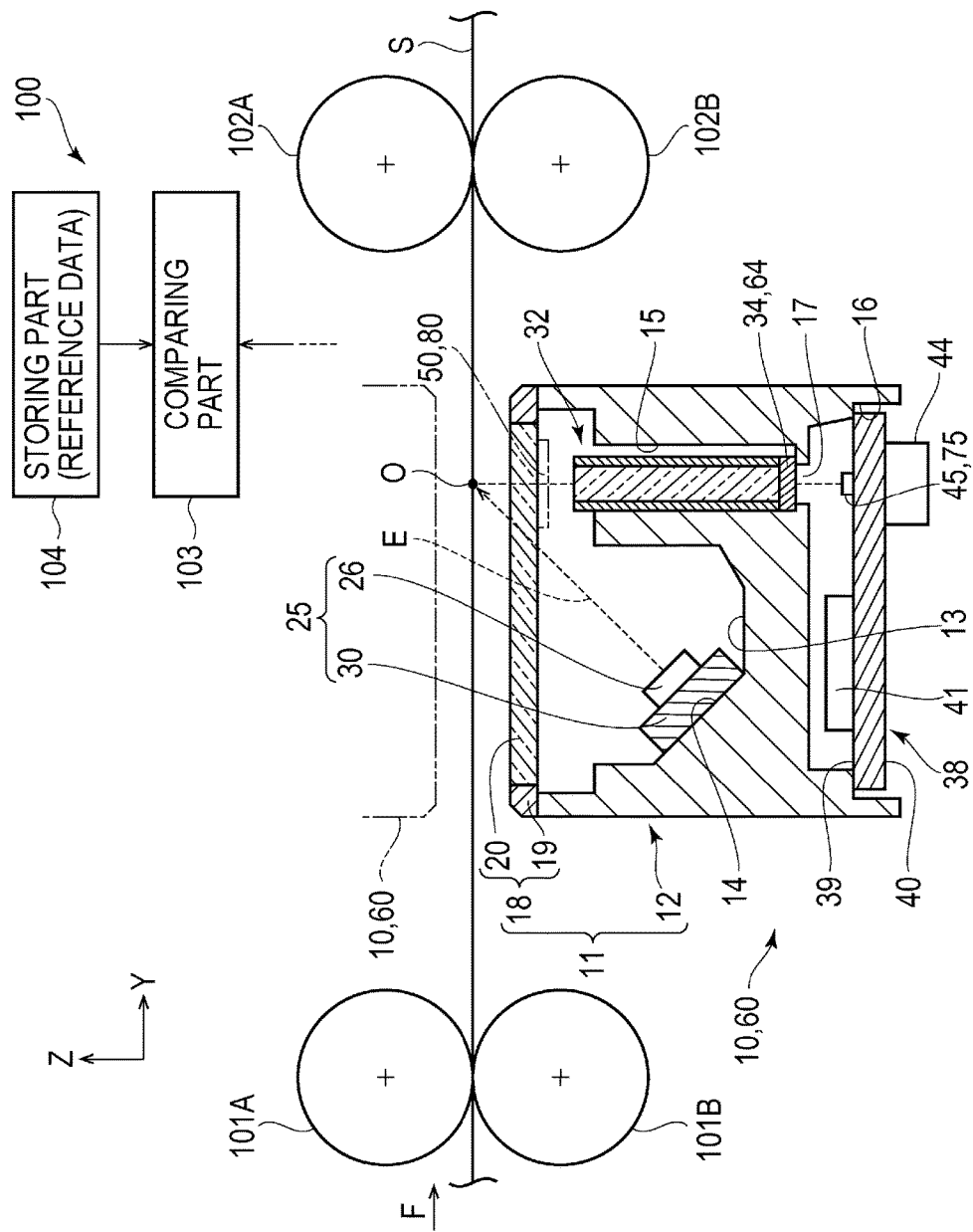
FIG. 1 shows a sectional view showing a configuration of essential parts of an image reading apparatus.

FIG. 1 is a schematic view illustrating essential parts of the image reading apparatus 100 provided with an image sensor unit 10 according to this embodiment. First, the entire configuration will be schematically described. In this embodiment, a bill S will be described as a typical example of an object to be illuminated. However, the present invention can also be applied to other objects than the bill S.

In the image reading apparatus 100, a pair of conveyor rollers 101A and 101B and a pair of conveyor rollers 102A and 102B that serve as conveyance parts for conveying the bill S held therebetween are disposed at predetermined positions at a predetermined distance in a conveyance direction F of the bill S. The conveyor rollers 101A, 101B, 102A and 102B are designed to be rotated by a driving mechanism to convey relatively the bill S to the image sensor unit 10 at a predetermined conveyance speed in the conveyance direction F.

The image sensor unit 10 is disposed between the conveyor rollers 101A and 101B and the conveyor rollers 102A and 102B, and emits light to the conveyed bill S and reads image information from reflected light from the bill S.

A comparing part 103 is connected to the image sensor unit 10. The comparing part 103 acquires the image information read by the image sensor unit 10. Further, the comparing part 103 reads reference data stored in a storing part 104, compares the data with the acquired image information, and authenticates the bill S.

Next, the configuration of the image sensor unit 10 is described. The image sensor unit 10 of this embodiment can detect the irradiation intensity of the light source part that emits ultraviolet light while including an ultraviolet cut part that cuts off ultraviolet light.

Figure 2:
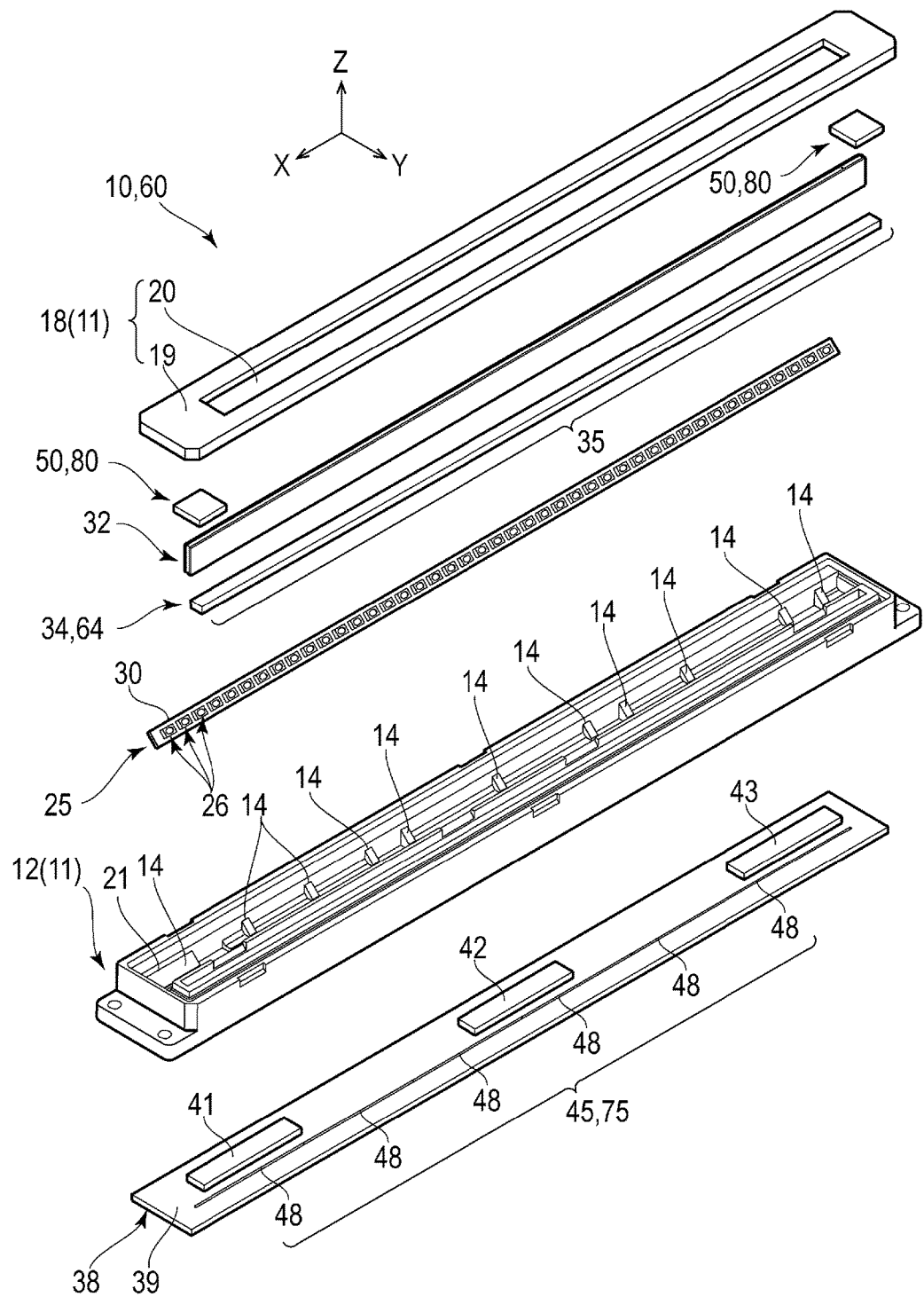
FIG. 2 is a schematic exploded view of an image sensor unit.
Figure 3:
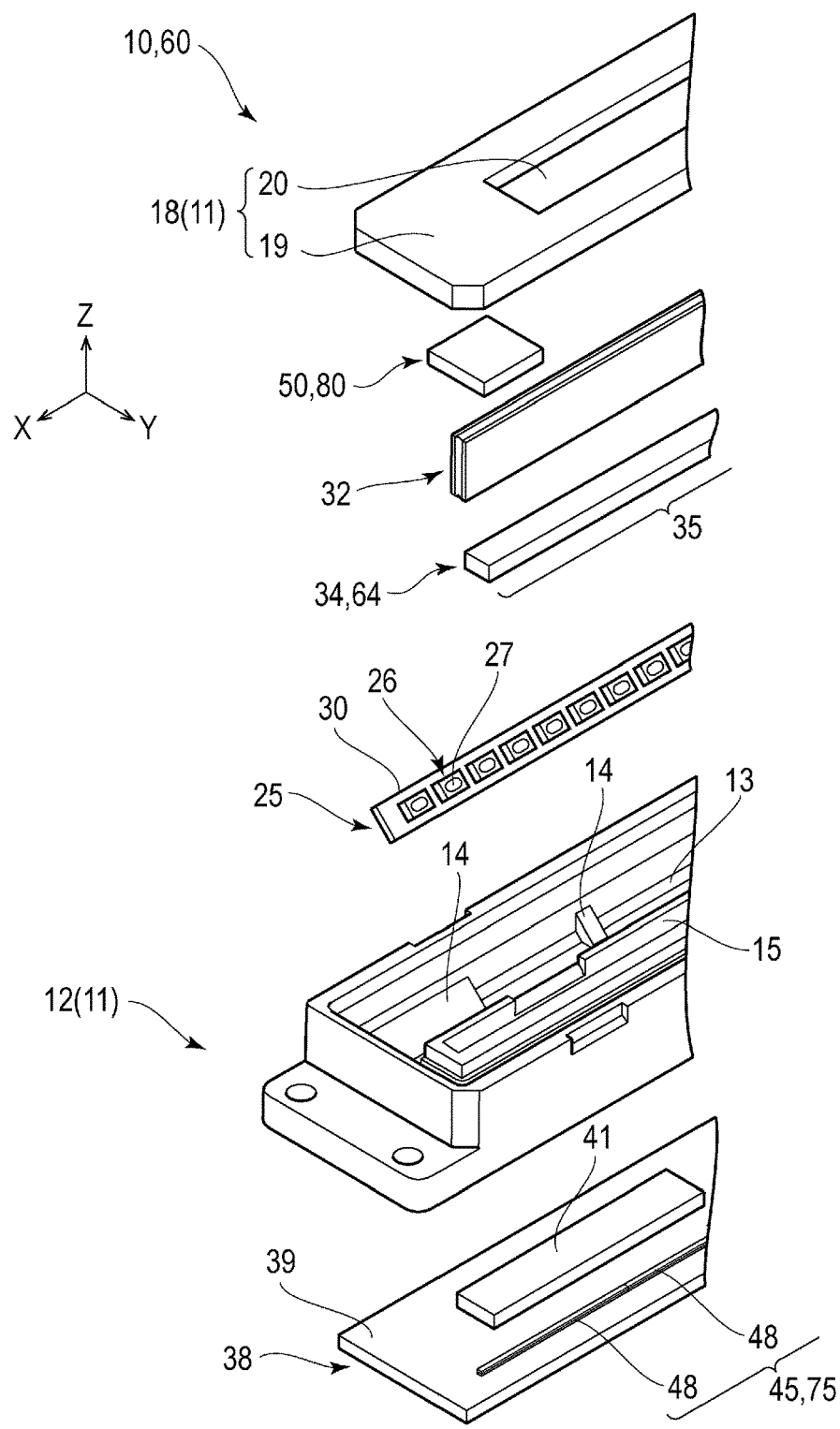
FIG. 3 is an enlarged schematic exploded view of the image sensor unit.
Figure 4:
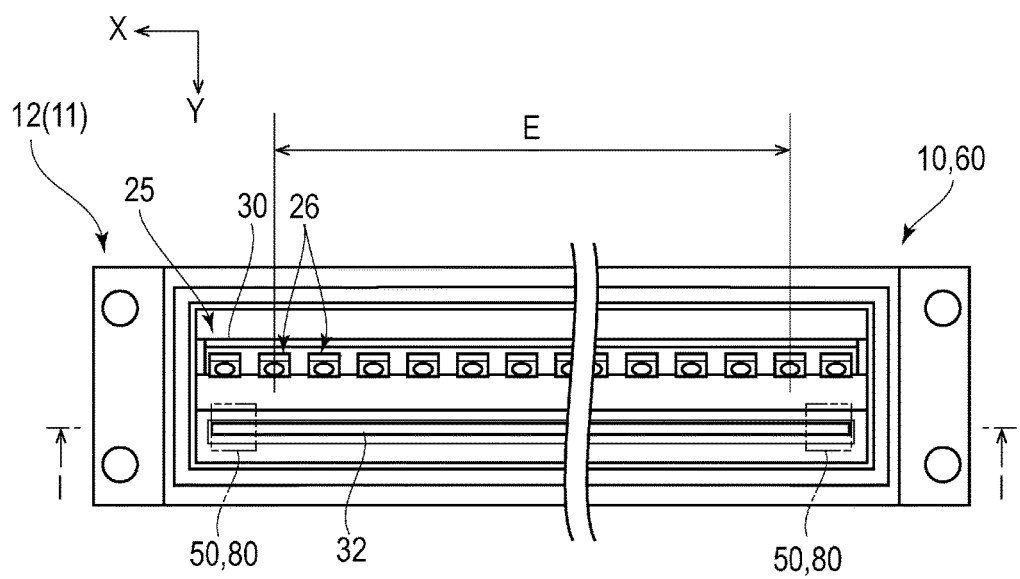
FIG. 4 is a plan view of the image sensor unit.
Figure 5:
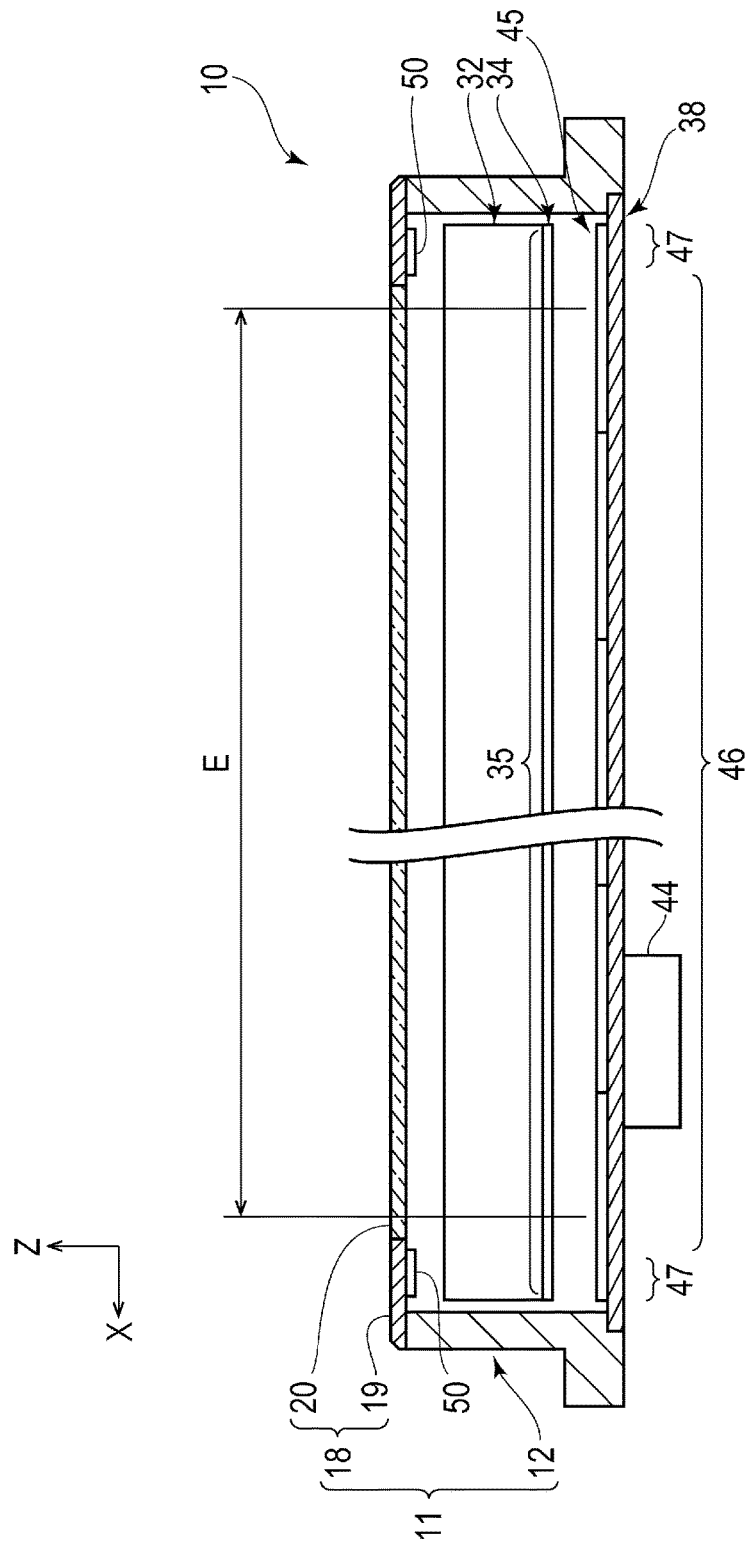
FIG. 5 is a sectional view of the image sensor unit of the first embodiment.

FIG. 2 is a schematic exploded view of the image sensor unit 10. FIG. 3 is a perspective view where one side of the image sensor unit 10 shown in FIG. 2 in the main-scan direction is enlarged. FIG. 4 is a plan view of the image sensor unit 10 from which a cover body is omitted. FIG. 5 is a sectional view of the image sensor unit 10 where line I-I shown in FIG. 4 is viewed from the arrow direction.

The image sensor unit 10 has a generally rectangular parallelepiped shape, the longitudinal direction being aligned with the main-scan direction, and the sub-scan direction perpendicular to the main-scan direction being aligned with the conveyance direction F for the bill S.

The image sensor unit 10 includes a frame 11, a light source part 25, a light condenser 32, a filter member 34, a sensor substrate 38, an image sensor 45, and reference members 50. The light source part 25 among these configuration members functions as an illumination device. The frame 11, the light source part 25, the light condenser 32, the filter member 34, the sensor substrate 38 and the image sensor 45 are formed to have lengths according to the dimension of the bill S, which is to be read, in the main-scan direction.

The frame 11 includes a frame body 12 that houses each configuration member of the image sensor unit 10, and a cover body 18 with which the frame body 12 is lidded.

The frame body 12 supports each configuration member of the image sensor unit 10 at a predetermined position. The frame body 12 has a substantially rectangular parallelepiped shape with the longitudinal direction being aligned with the main-scan direction, and is formed with a resin material that is colored in black to have a light blocking property, for example. For example, polycarbonate can be applied as the resin material.

As shown in FIG. 1, the frame body 12 includes a light source housing part 13 that houses the light source part 25, a light condenser housing part 15 that houses the light condenser 32, and a substrate housing part 16 that houses the sensor substrate 38, which are formed along the main-scan direction.

The light source housing part 13 is a space open toward the upper side (bill S side). At the light source housing part 13, light source supporting parts 14 that hold the light source part 25 are formed. The light source supporting parts 14 hold the light source part 25 in an inclined state. The light source supporting parts 14 are formed at intervals in the main-scan direction of the frame 11. The light source part 25 is fixed in the light source housing part 13 with adhesive applied onto the light source supporting parts 14.

The light condenser housing part 15 is a groove that is open upward. The light condenser housing part 15 houses the light condenser 32 in a state where the optical axis is along the vertical direction. The light condenser 32 is fixed in the light condenser housing part 15 with adhesive applied onto the light condenser housing part 15.

The substrate housing part 16 is a space that is open downward. The substrate housing part 16 houses the sensor substrate 38 in a state where its mounting surfaces are perpendicular to the vertical direction. The sensor substrate 38 is fixed in the substrate housing part 16 by heat-caulking a boss or the like that is formed on the frame 11 but is not shown. The light condenser housing part 15 and the substrate housing part 16 communicate with each other through an opening 17.

The cover body 18 prevents dusts from entering the inside of the frame body 12. The cover body 18 allows the light from the light source part 25 to transmit therethrough toward the bill S, and allows the light from the bill S to transmit into the frame body 12. The cover body 18 is fixed with, for example, double-faced tape or the like so as to cover the frame body 12 from the upper side. The cover body 18 includes a holder 19 and cover glass 20.

The holder 19 holds the cover glass 20 at the center. The holder 19 has a substantially planar shape with the longitudinal direction being aligned with the main-scan direction, and is formed with a resin material that is colored in black to have a light blocking property, for example. For example, polycarbonate can be applied as the resin material.

The cover glass 20 is a planar transmissive member with the longitudinal direction being aligned with the main-scan direction. The cover glass 20 is not limited to what is made of glass. For example, a transparent resin material, for example, acrylic, polycarbonate or the like can be applied as the cover glass 20.

The light source part 25 emits at least ultraviolet light as a line of light in the main-scan direction to the bill S that is being conveyed. As shown in FIG. 4, the light source part 25 is disposed up to a position beyond an effective reading range E, and emits light to a range wider in the main-scan direction than the effective reading range E. Here, the effective reading range E is a range in which the image sensor unit 10 actually reads the bill S.

The light source part 25 includes a plurality of light sources 26, and a light source substrate 30 on which the plurality of light sources 26 are mounted. As shown in FIG. 3, what has a surface on which LED chips 27 as light emitting elements are mounted and is called a top view type surface-mounted LED package can be applied as each light source 26. In the LED package, the LED chips 27 are disposed on the surface of the LED package in a state of being enclosed with a transparent resin. Here, the light sources 26 that emit ultraviolet light of 350 to 400 nm, for example, are adopted so as to detect a fluorescent image (characters or diagrams that are formed, when ultraviolet light is emitted to the bill S, with fluorescent light emitted from a fluorescent material contained in the bill S) on the bill S. Here, the fluorescent material is, typically, a material having characteristics that absorb light having a certain predetermined wavelength and emit light (fluorescent light) having longer wavelengths than the absorbed light has. In particular, in the present invention, the material is a material having characteristics that absorb ultraviolet light and emit visible light (fluorescent light).

The light source part 25 may be configured so that all the light sources 26 can emit ultraviolet light, or configured so that some of the light sources 26 can emit visible light, such as red, green and blue light, and infrared light, for example.

The light source substrate 30 has a planar shape with the longitudinal direction being aligned with the main-scan direction. The plurality of light sources 26 are mounted on the light source substrate 30 in a state of being arranged in line along the main-scan direction. A circuit pattern, not shown, is applied onto the light source substrate 30, and allows the mounted light sources 26 to be electrically conductive to each other. On the light source substrate 30, the plurality of light sources 26 are not necessarily mounted in line along the main-scan direction. Alternatively, the light sources may be mounted in two or more lines.

The light condenser 32 focuses light from the bill S and focuses the light on the image sensor 45. The light condenser 32 is formed in a rod shape with the longitudinal direction being aligned with the main-scan direction. As shown in FIG. 5, the light condenser 32 is disposed up to a position beyond the effective reading range E. For example, a rod lens array that includes a plurality of imaging elements (rod lenses) of an erect equal magnification imaging type linearly arranged in the main-scan direction can be applied as the light condenser 32. The light condenser 32 may be anything that can focus light on the image sensor 45. For example, any of conventionally, publicly known optical members having various light condensing functions, such as various microlens arrays, can be applied as the light condenser 32.

The filter member 34 blocks light having predetermined wavelengths. The filter member 34 is formed in a planar shape with the longitudinal direction being aligned with the main-scan direction. As shown in FIG. 5, the filter member 34 is disposed up to a position beyond the effective reading range E. The filter member 34 has the same length as the length of the light condenser 32 in the main-scan direction and the length of the image sensor 45 in the main-scan direction, and is disposed along the lower surface of the light condenser 32.

An ultraviolet cut part 35 is formed over the entire length of the filter member 34 of this embodiment in the main-scan direction. The ultraviolet cut part 35 cuts off ultraviolet light by absorbing the ultraviolet light in the light from the bill S. More specifically, the ultraviolet cut part 35 cuts off light of 450 nm or less (a part of visible light and ultraviolet light). Conversely, the ultraviolet cut part 35 allows light having longer wavelengths than about 450 nm. Consequently, the fluorescent light caused by exciting the fluorescent material applied onto the bill S with ultraviolet light has wavelengths of 400 to 700 nm, mainly ranging from 500 to 650 nm, for example. Accordingly, the ultraviolet cut part 35 can allow the fluorescent light to transmit therethrough.

Ultraviolet absorption film that is transparent film containing ultraviolet absorption agent, or glass deposited with a metal oxide or a dielectric material having a different transmittance and refractive index can be applied as the ultraviolet cut part 35. The ultraviolet cut part 35 may be anything that can cut off at least ultraviolet light, and is not limited to what has a specific material or structure. The ultraviolet cut part 35 is not limited to the case of being disposed on the lower surface of the light condenser 32. Alternatively, this part can be disposed in any manner only if this part is arranged between the bill S and the image sensor 45. Consequently, the ultraviolet cut part 35 may be configured by forming deposited film on at least any one of the upper and lower surfaces of the light condenser 32, for example.

On the sensor substrate 38, various configuration members are mounted. The sensor substrate 38 is formed in a planar shape with the longitudinal direction being aligned with the main-scan direction. As shown in FIG. 2, an illuminance storing circuit 41 as an illuminance storing part, an illuminance comparing circuit 42 as an illuminance comparing part, a drive circuit 43 as a correcting part, image sensor 45 and the like are mounted on a mounting surface 39 that is the upper surface of the sensor substrate 38. As shown in FIG. 1, a connector 44 to which a cable is connected is mounted on a mounting surface 40 that is the lower surface of the sensor substrate 38; the cable is for transmitting and receiving a signal to and from the image sensor unit 10 and supplying electricity thereto.

The illuminance storing circuit 41 stores information required when the irradiation intensity of the light source part 25 is corrected. More specifically, the illuminance storing circuit 41 stores information on the reference irradiation intensity of the light source part 25, information for correcting the irradiation intensity and the like. Any of various publicly known nonvolatile memories can be applied as the illuminance storing circuit 41.

The illuminance comparing circuit 42 compares the irradiation intensity of the light source part 25 with the reference irradiation intensity stored in the illuminance storing circuit 41.

The drive circuit 43 controls and drives the light source part 25 and the image sensor 45. More specifically, the drive circuit 43 causes the light source part 25 to emit light, and causes the image sensor 45 to detect light. The drive circuit 43 corrects the irradiation intensity of the light source part 25 on the basis of the comparison result by the illuminance comparing circuit 42. The irradiation intensity correction by the illuminance comparing circuit 42 and the drive circuit 43 is described later.

The light from the bill S is focused by the light condenser 32 and received by the image sensor 45, which converts the light into an electric signal. The image sensor 45 is disposed below the light condenser 32. In the image sensor 45, a predetermined number of image sensor ICs 48 that include a plurality of photoelectric conversion elements according to the reading resolution of the image sensor unit 10 are arranged on the mounting surface 39 linearly in the main-scan direction. The image sensor 45 is disposed up to a position beyond the effective reading range E. The image sensor 45 may be anything that can convert the light from the bill S into the electric signal, and is not limited to have the above-described configuration. Any of various image sensor ICs having been conventionally, publicly known can be applied as the image sensor IC 48.

As shown in FIG. 5, the image sensor 45 includes a reading detection part 46, and correcting detection parts 47.

The reading detection part 46 is mainly disposed in the effective reading range E. The reading detection part 46 detects fluorescent light that has been caused from the fluorescent image on the bill S being excited with ultraviolet light and has transmitted through the ultraviolet cut part 35.

On the other hand, the correcting detection parts 47 are disposed outside of the effective reading range E. The correcting detection parts 47 overlap with the respective reference members 50 in a plan view. The correcting detection parts 47 detect fluorescent light having been caused from the reference members 50 being excited with ultraviolet light.

The reference members 50 are members for determining the irradiation intensity of light emitted from the light sources 26. Each reference member 50 is formed to have a planar shape.

The reference members 50 are attached to the opposite ends of the frame 11 in the main-scan direction. More specifically, as indicated with chain double-dashed lines in FIG. 4, the reference members 50 are disposed at positions overlapping with the opposite ends of the light condenser 32 in the main-scan direction in the frame 11. As shown in FIG. 5, the reference members 50 are attached onto the lower surface of the cover body 18 between the bill S and the light condenser 32.

The reference member 50 of this embodiment is made of a material that emits fluorescent light by being irradiated and excited with ultraviolet light. More specifically, for example, an organic substance, such as polyethylene terephthalate (PET) or polyvinyl chloride (PVC) can be applied as the reference member 50. Fluorescent ink is applied onto the lower surface of the reference member 50; this surface is to be irradiated with ultraviolet light from the light source part 25.

Consequently, emission of ultraviolet light from the light source part 25 excites the fluorescent ink of the reference members 50 to emit fluorescent light. If a part of ultraviolet light transmits through the fluorescent ink, the material of the reference members 50 is excited to emit fluorescent light. The reference member 50 is excited with ultraviolet light, thereby causing light having wavelength of 450 to 700 nm.

Next, a basic operation of the image sensor unit 10 having the configuration as described above is described. The conveyor rollers 101A, 101B, 102A and 102B convey the bill S in the conveyance direction F at a predetermined conveyance speed. At this time, the light source part 25 emits light being directed to a reading position O on the bill S as indicated by an arrow E typically illustrated in FIG. 1. Consequently, the lower surface of the bill S is irradiated uniformly with linear light over the main-scan direction.

At this time, in the case where the bill S contains the fluorescent image, the image is excited with the ultraviolet light to emit fluorescent light. The fluorescent light is focused by the light condenser 32, and is focused on the image sensor 45 (reading detection part 46). The ultraviolet light emitted to the position without the fluorescent image is reflected by the bill S. However, the reflected light is cut off by the ultraviolet cut part 35 of the filter member 34. Consequently, the reflected light is not focused on the image sensor 45. The reading detection part 46 of the image sensor 45 converts the focused fluorescent light into an electric signal, and reads the signal as an image. In a case where the light source part 25 includes light sources 26 that emit light other than ultraviolet light, the light sources 26 are sequentially caused to emit light, thereby allowing the reading detection part 46 of the image sensor 45 to convert the focused light into the electric signal and read the signal as an image.

The image sensor 45 reads one scan line of the light, and thus completes the reading operation for one scan line in the main-scan direction. When the reading operation for one scan line is completed, the bill S is moved in the sub-scan direction, and the same reading operation as described above is performed for the next one scan line. The reading operation for one scan line is repeated while conveying the bill S in the conveyance direction F, thereby sequentially scanning the whole surface of the bill S to achieve reading of the image information.

The image sensor unit 10 transmits read image information to the comparing part 103. The comparing part 103 compares the reference data with the obtained image information, thereby allowing the bill S to be authenticated.

Figure 6:
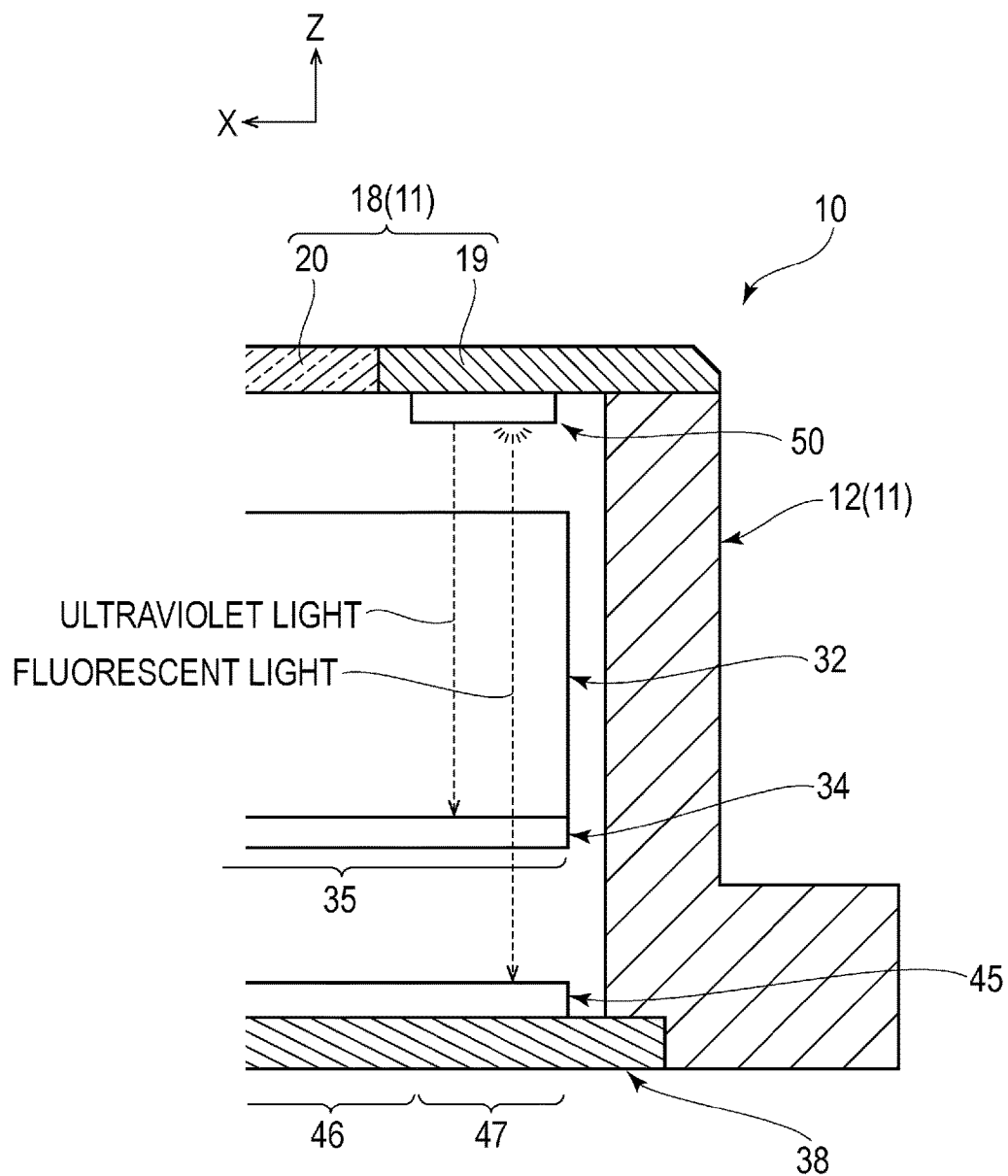
FIG. 6 is an enlarged sectional view of the image sensor unit of the first embodiment.

Next, a correction operation of the image sensor unit 10 having the configuration as described above is described with reference to FIG. 6. FIG. 6 is a partially enlarged diagram of the other side of the image sensor unit 10 shown in FIG. 5 in the main-scan direction.

First, the drive circuit 43 causes the light source part 25 to emit light after the image sensor unit 10 has been manufactured and before this unit is shipped. The light source part 25 emits ultraviolet light even to the outsides of the effective reading range E exceeding this range. Consequently, parts of the light are emitted to the reference members 50. Consequently, the reference member 50 is excited with the ultraviolet light to thereby emit fluorescent light. The fluorescent light is focused by the light condenser 32 and is focused on the image sensor 45 (correcting detection parts 47) without being cut off by the ultraviolet cut part 35. The correcting detection parts 47 of the image sensor 45 convert the focused fluorescent light into an electric signal and read the signal, thereby detecting the irradiation intensity of the light source part 25 with intervention of the reference members 50. The drive circuit 43 stores the irradiation intensity detected by the correcting detection parts 47, as the reference irradiation intensity, in the illuminance storing circuit 41. At this time, the parts of the ultraviolet light emitted to the reference members 50 are reflected by the reference members 50 but are cut off by the ultraviolet cut part 35. Consequently, the reflected light is not focused on the image sensor 45. In this embodiment, the reference members 50 and the correcting detection parts 47 are respectively disposed at the opposite ends of the image sensor unit 10. Consequently, the average value of the irradiation intensities detected by the two correcting detection parts 47 may be stored as the reference irradiation intensity.

Subsequently, after the image sensor unit 10 is shipped, the image sensor unit 10 periodically (for example, on at every activation) detects the irradiation intensity of the light source part 25 with intervention of the reference members 50 as with the above-described operation. The illuminance comparing circuit 42 compares the irradiation intensity detected by the correcting detection parts 47 of the image sensor 45 with the reference irradiation intensity stored in the illuminance storing circuit 41. The drive circuit 43 corrects the irradiation intensity of the light source part 25 by performing current control or PWM control so that the irradiation intensity detected by the correcting detection parts 47 of the image sensor 45 can be the reference irradiation intensity, on the basis of the comparison result by the illuminance comparing circuit 42. Consequently, when the bill S is read, the light source part 25 can emit ultraviolet light having the corrected irradiation intensity. That is, even if the irradiation intensity of the light sources 26 of the light source part 25 is reduced owing to deterioration with age, the light source part 25 can emit light having the irradiation intensity that is not different from that at the time of manufacture.

In this embodiment, the reference members 50 and the correcting detection parts 47 are respectively disposed at the opposite ends of the image sensor unit 10. Consequently, the drive circuit 43 may correct the irradiation intensity of the light source part 25 so that the average value of the irradiation intensities detected by the two correcting detection parts 47 can be the reference irradiation intensity.

In this embodiment, a material that emits fluorescent light by being irradiated and excited with ultraviolet light is adopted as the material of the reference member 50. Consequently, although the image sensor unit 10 includes the ultraviolet cut part 35, the image sensor 45 can detect the irradiation intensity of the light source part 25 intervention of the reference members 50. Therefore, the image sensor unit 10 can correct the irradiation intensity of the light source part 25 on the basis of the fluorescent light emitted from the reference members 50.

Second Embodiment

In the first embodiment, the case is described where the material that emits fluorescent light by being irradiated and excited with ultraviolet light is adopted as the material of the reference members 50. An organic substance that causes a fluorescent reaction is applied as the material of the reference members 50 so as to cause the fluorescent light as described above. On the other hand, the organic substance that causes the fluorescent reaction deteriorates with age owing to irradiation with ultraviolet light. Accordingly, even if ultraviolet light is emitted to the reference members 50 and fluorescent light is detected in order to correct the irradiation intensity of the light source part 25, it cannot be determined whether the reference members 50 have deteriorated or the light source part 25 has deteriorated and the irradiation intensity of the light source part 25 cannot be accurately corrected in some cases.

To solve this, in this embodiment, a material that does not deteriorate even if the ultraviolet light is emitted to the reference members is adopted for the reference members. In this case, even with irradiation with ultraviolet light, the reference members are not excited and only reflect the ultraviolet light. Accordingly, a filter member in this embodiment is configured to have a part that allows the parts of ultraviolet light reflected by the reference members to transmit therethrough.

Hereinafter, an image sensor unit 60 in this embodiment is described. The description of the configuration elements analogous to those in the first embodiment is appropriately omitted.

The image sensor unit 60 in this embodiment is a unit where the reference members 50, the filter member 34, and the image sensor 45 among the configuration members of the image sensor unit 10 in the first embodiment are replaced with reference members 80, a filter member 64, and an image sensor 75, respectively. The positions at which the reference members 80, the filter member 64, and the image sensor 75 are disposed are analogous to the positions at which the reference members 50, the filter member 34, and the image sensor 45 in the first embodiment are disposed as shown in FIGS. 1 to 4. The different points are mainly described.

Figure 7:
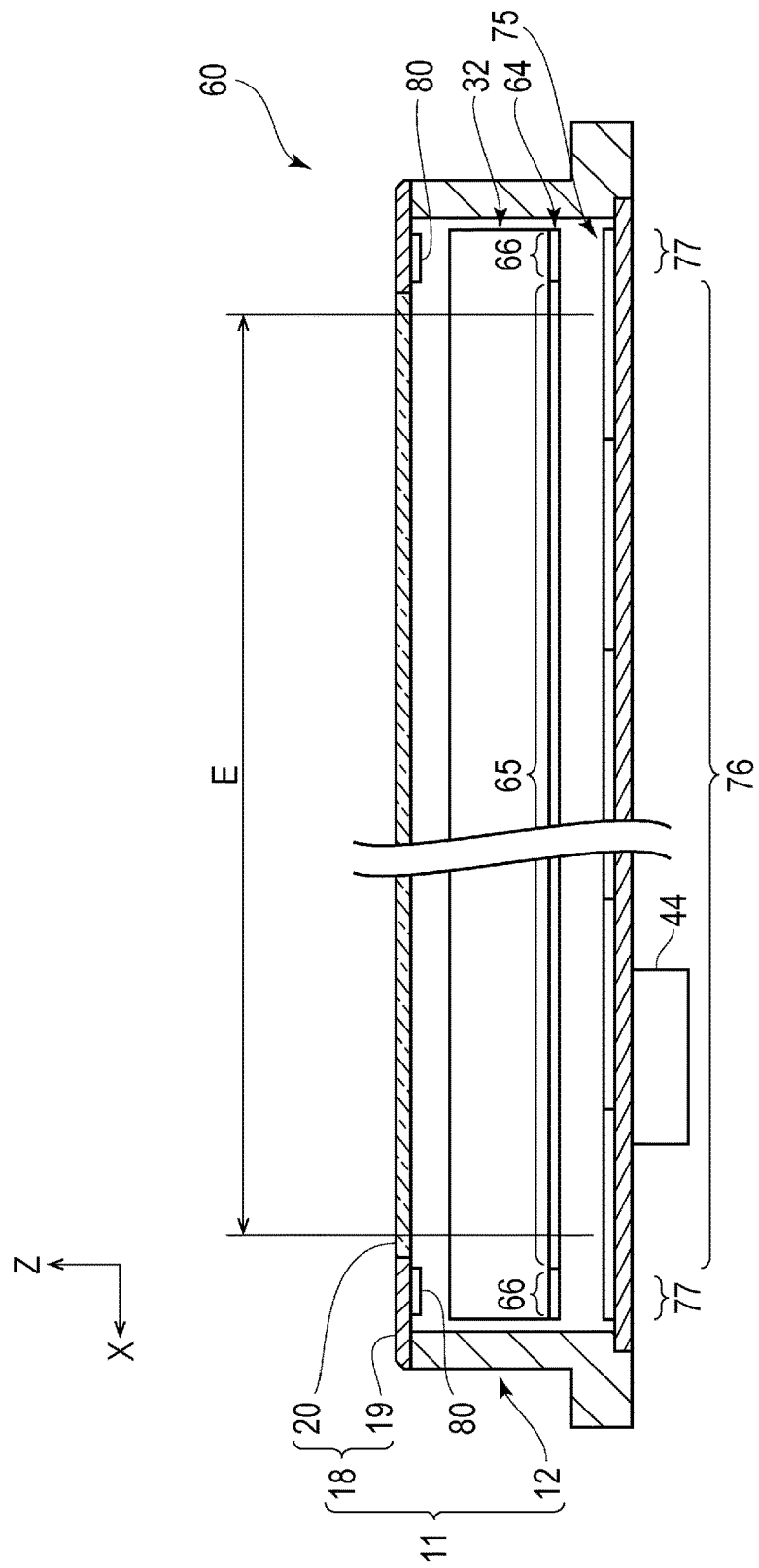
FIG. 7 is a sectional view of the image sensor unit of a second embodiment.
Figure 8:
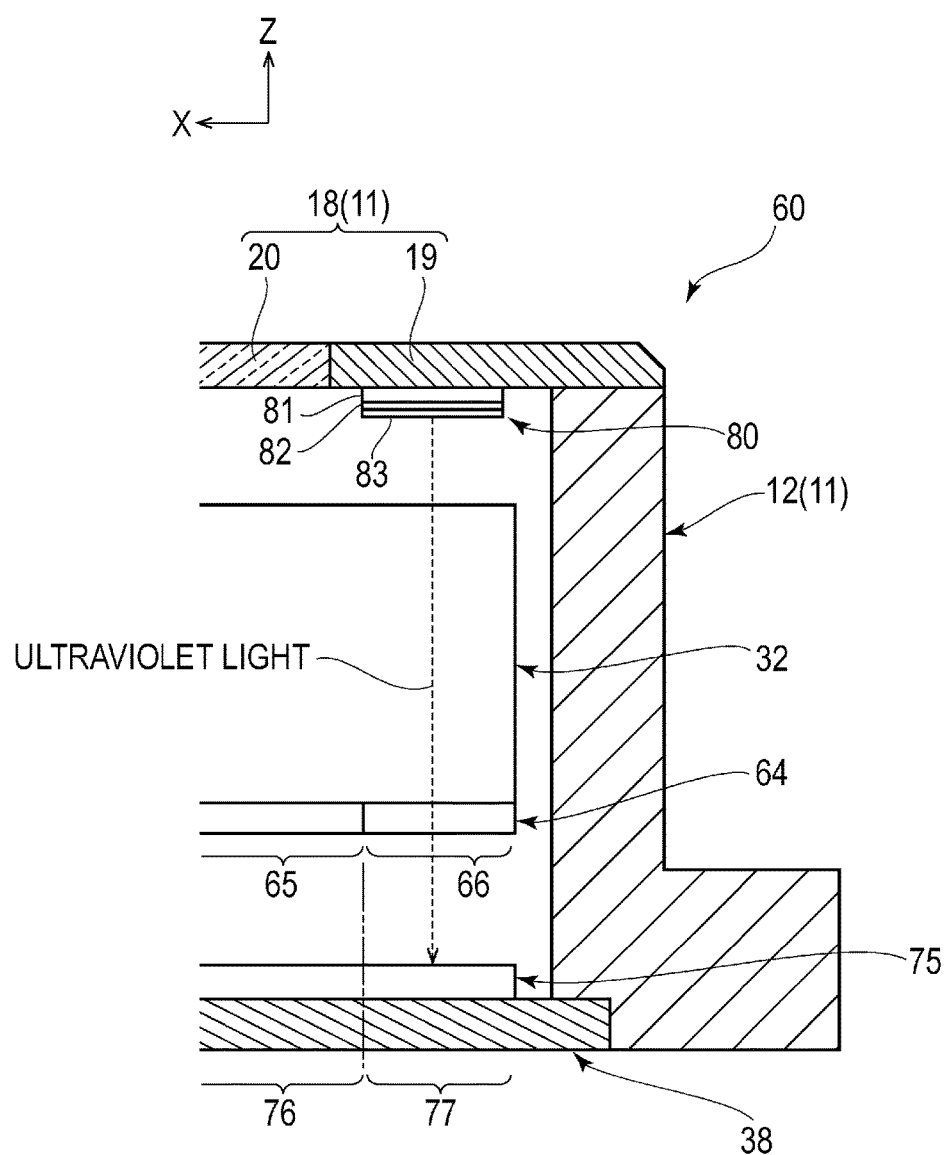
FIG. 8 is an enlarged sectional view of the image sensor unit of the second embodiment.

FIG. 7 is a sectional view of the image sensor unit 60 in the second embodiment where line I-I shown in FIG. 4 is viewed from the arrow direction. FIG. 8 is a partially enlarged diagram of the other side of the image sensor unit 60 shown in FIG. 7 in the main-scan direction.

The reference members 80 are members for determining the irradiation intensity of light emitted from the light sources 26. The reference members 80 in this embodiment function as a reflecting part that reflects emitted ultraviolet light. That is, the reference members 80 includes at least a reflection surface made of a material that is not excited with ultraviolet light. More specifically, as shown in FIG. 8, a material where a base part 81 made of polyvinyl chloride (PVC), a reflection layer 82 made of ink containing inorganic materials including an aluminum alloy, and a fluorine-coated protective layer 83 are stacked can be applied as the reference members 80. "JS-1805XL" by 3M Japan Limited can be adopted as such a material. The ink containing inorganic materials has characteristics of not being excited with ultraviolet light. The fluorine coating has characteristics that allow ultraviolet light to transmit therethrough and protect the reflection layer.

Alternatively, a material that is barium-sulfate-(BaSO4)-contained polypropylene (PP) can be applied as the reference members 80. Polypropylene has characteristics that are not excited with ultraviolet light. Barium sulfate has characteristics that efficiently reflect ultraviolet light.

The filter member 64 includes an ultraviolet cut part 65, and ultraviolet transmitting parts 66.

The ultraviolet cut part 65 is mainly disposed in the effective reading range E. The ultraviolet cut part 65 cuts off ultraviolet light in light from the bill S, and allows fluorescent light caused by the fluorescent image of the bill S being irradiated with the ultraviolet light to transmit therethrough. That is, the ultraviolet cut part 65 has the same function as that of the ultraviolet cut part 35 in the first embodiment.

On the other hand, the ultraviolet transmitting parts 66 are formed outside of the effective reading range E. More specifically, the ultraviolet transmitting parts 66 are formed at positions overlapping with the reference members 80 in a plan view. The ultraviolet transmitting parts 66 allow ultraviolet light to transmit therethrough. That is, the ultraviolet transmitting parts 66 allow the ultraviolet light reflected by the reference members 80 to transmit therethrough. The ultraviolet transmitting parts 66 are configured to allow not only ultraviolet light but also visible light, infrared light and the like to transmit. Consequently, the ultraviolet transmitting parts 66 can be configured by omitting deposition on the opposite ends of the ultraviolet cut part 35 of the filter member 34 in the first embodiment and only including glass instead, for example. The ultraviolet transmitting parts 66 can be configured by cutting one or both of ends of the ultraviolet cut part 35 of the filter member 34 in the first embodiment to make this part shorter than the light condenser 32 and the image sensor 75.

The image sensor 75 receives light focused by the light condenser 32, and converts the light into an electric signal. The image sensor 75 includes a reading detection part 76, and correcting detection parts 77.

The reading detection part 76 is mainly disposed in the effective reading range E. The reading detection part 76 overlaps with the ultraviolet cut part 65 of the filter member 64 in a plan view. Consequently, the reading detection part 76 detects fluorescent light that has been caused from the fluorescent image on the bill S being excited with ultraviolet light and has transmitted through the ultraviolet cut part 65.

On the other hand, the correcting detection parts 77 are disposed outside of the effective reading range E. The correcting detection parts 77 overlap with the reference members 80 and the ultraviolet transmitting parts 66 in a plan view. In other words, the correcting detection parts 77 do not overlap with the ultraviolet cut part 65. Consequently, the correcting detection parts 77 detect light that has been reflected by the reference members 80 and has not transmitted through the ultraviolet cut part 65 in the ultraviolet light emitted by the light source part 25. That is, the correcting detection parts 77 function as an ultraviolet detection part.

A basic operation of the image sensor unit 60 having the configuration as described above is analogous to that of the first embodiment.

Next, a correction operation of the image sensor unit 60 is described with reference to FIG. 8.

First, the drive circuit 43 causes the light source part 25 to emit light after the image sensor unit 60 has been manufactured and before this unit is shipped. The light source part 25 emits ultraviolet light even to the outsides of the effective reading range E exceeding this range. Consequently, parts of the light are emitted to the reference members 80. The ultraviolet light emitted by the reference members 80 transmits through the protective layer 83 and are reflected by the reflection layer 82. Here, the reference members 80 in this embodiment are not excited with the emitted ultraviolet light but reflect this light instead. Consequently, the reflected ultraviolet light is focused by the light condenser 32. The ultraviolet light focused by the light condenser 32 transmits through the ultraviolet transmitting parts 66. Consequently, this light is not cut off by the filter member 64 and is focused on the image sensor 75 (correcting detection parts 77). The correcting detection parts 77 of the image sensor 75 convert the focused ultraviolet light into an electric signal and read the signal, thereby detecting the irradiation intensity of the light source part 25 with intervention of the reference members 80. The drive circuit 43 stores the irradiation intensity detected by the correcting detection parts 77, as the reference irradiation intensity, in the illuminance storing circuit 41.

Subsequently, after the image sensor unit 60 is shipped, the image sensor unit 60 periodically (for example, on every activation) detects the irradiation intensity of the light source part 25 with intervention of the reference members 80, as with the operation described above. The illuminance comparing circuit 42 compares the irradiation intensity detected by the correcting detection parts 77 of the image sensor 75 with the reference irradiation intensity stored in the illuminance storing circuit 41. The drive circuit 43 corrects the irradiation intensity of the light source part 25 by performing current control or PWM control so that the irradiation intensity detected by the correcting detection parts 77 of the image sensor 75 can be the reference irradiation intensity on the basis of the comparison result by the illuminance comparing circuit 42. Consequently, when the bill S is read, the light source part 25 can emit ultraviolet light having the corrected irradiation intensity. That is, even if the irradiation intensity of the light sources 26 of the light source part 25 is reduced owing to deterioration with age, the light source part 25 can emit light having the irradiation intensity that is not different from that at the time of manufacture.

In this embodiment, the reference members 80 and the correcting detection parts 77 are disposed at the opposite ends of the image sensor unit 60. Consequently, the drive circuit 43 may correct the irradiation intensity of the light source part 25 so that the average value of the irradiation intensities detected by the two correcting detection parts 77 can be the reference irradiation intensity.

As with this embodiment, the image sensor 75 includes the correcting detection parts 77 that detect light that has been reflected by the reference members 80 and has not transmit through the ultraviolet cut part 65. That is, the ultraviolet light reflected by the reference members 80 is not cut off by the ultraviolet cut part 65 and is detected by the correcting detection parts 77. Consequently, although the image sensor unit 60 includes the ultraviolet cut part 65, the correcting detection parts 77 can detect the irradiation intensity of the light source part 25 with intervention of the reference members 80. Therefore, the image sensor unit 60 can correct the irradiation intensity of the light source part 25 on the basis of the ultraviolet light reflected by the reference members 80.

At this time, the correcting detection parts 77 of the image sensor 75 directly detect the ultraviolet light that is from the light source part 25 and is to be corrected, instead of the fluorescent light caused by excitation with the ultraviolet light. Consequently, the irradiation intensity of the light source part 25 can be accurately corrected.

An inorganic material that is not excited even if being irradiated with the ultraviolet light but reflects the light instead can be applied for the reference members 80. Accordingly, the reference members 80 can be prevented from deteriorating even with irradiation with the ultraviolet light. Consequently, adverse effects of the deterioration of the reference members 80 are removed from the irradiation intensity of the light source part 25 detected by the correcting detection parts 77 of the image sensor 75. Therefore, the image sensor unit 60 can accurately correct the irradiation intensity of the light source part 25.

The correcting detection parts 77 of the image sensor 75 are disposed at positions of overlapping with the positions at the light condenser 32 in a plan view while not overlapping with the ultraviolet cut part 65 of the filter member 64. Consequently, the correcting detection parts 77 can detect the ultraviolet light having transmitted through the ultraviolet transmitting parts 66.

The correcting detection parts 77 are disposed outside of the effective reading range E. Thus, the correcting detection parts 77 of the image sensor 75 are not used to read the bill S but are used to correct the irradiation intensity of the light source part 25. Consequently, the image sensor unit 60 can accurately correct the irradiation intensity of the light source part 25.

The reference members 80 are attached to the frame 11. Consequently, the relative positions between the light source part 25 and the reference members 80 are always unchanged. Accordingly, the image sensor unit 60 can correct the irradiation intensity of the light source part 25 at any timing.

At least parts of the reference members 80 are disposed at positions of overlapping with the positions at the light condenser 32 in a plan view while not overlapping with the ultraviolet cut part 65 of the filter member 64. Consequently, the correcting detection parts 77 can detect the ultraviolet light having been reflected by the reference members 80 and having transmitted through the ultraviolet transmitting parts 66.

The reference members 80 are disposed outside of the effective reading range E. If the reference members 80 are disposed in the effective reading range E, images of the reference members 80 are also read when reading the bill S. The arrangement of the reference members 80 outside of the effective reading range E can prevent the accuracy of reading the bill S from decreasing.

The reference member(s) 80 is (are) disposed at position(s) of overlapping with any one or both of the opposite ends of the light condenser 32 in the main-scan direction. Consequently, the images of the reference members 80 are prevented from being read when the image of the bill S is read. The arrangement of the reference members 80 at the positions overlapping with the opposite ends of the light condenser 32 in the longitudinal direction allows the correcting detection parts 77 to correct the irradiation intensity of the light source part 25 on the basis of the irradiation intensity of the ultraviolet light reflected by the two reference members 80, and allows the image sensor 75 to correct accurately the irradiation intensity of the light source part 25.

The reflection layers 82 of the reference members 80 are made of a material that is not excited with the ultraviolet light. Consequently, the reference members 80 can be prevented from deteriorating owing to the ultraviolet light.

Third Embodiment

Next, a configuration where the above-described image sensor unit 10, 60 is applied to a flatbed-type scanner as an image reading apparatus is described with reference to FIG. 9.

Figure 9:
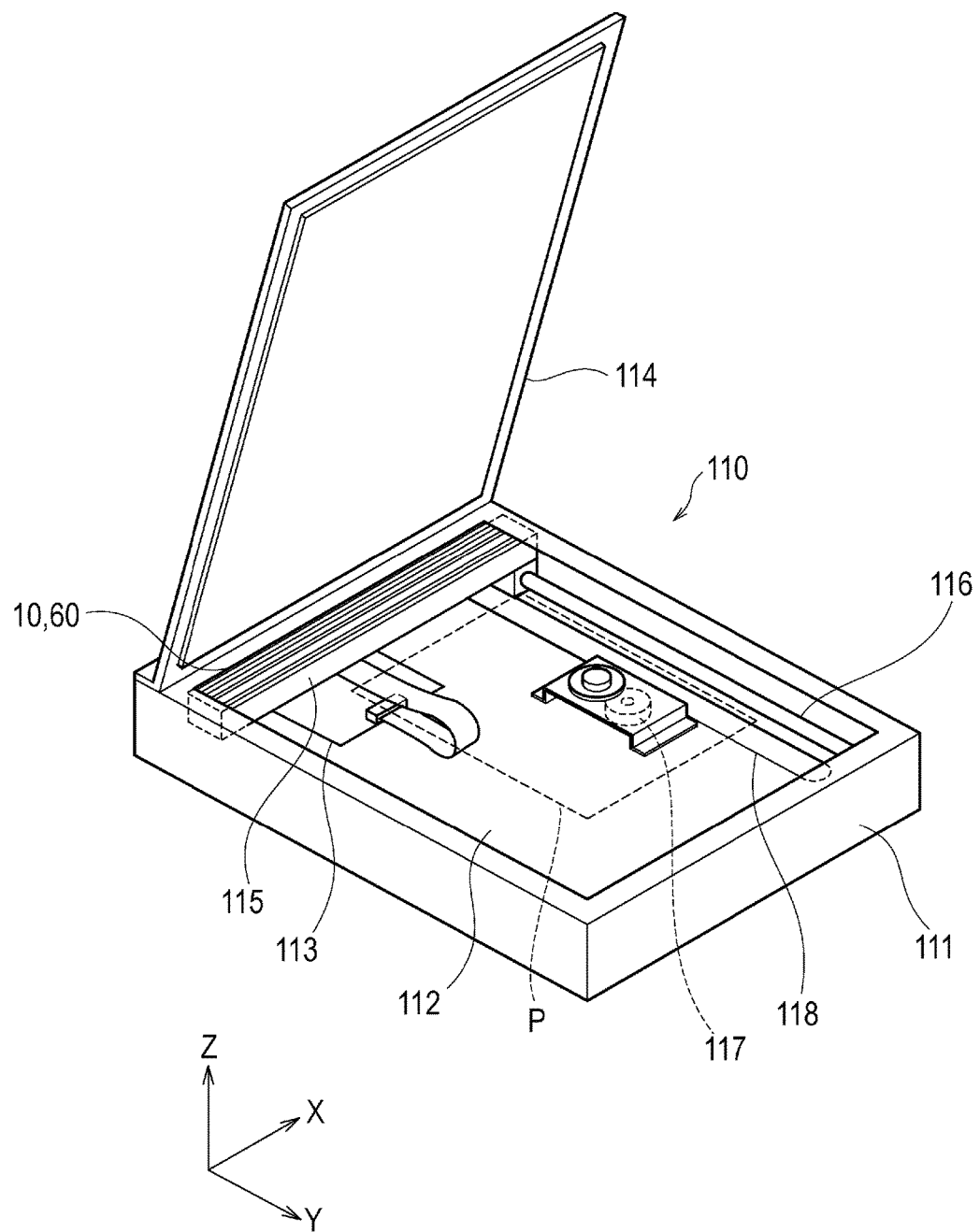
FIG. 9 is a perspective view showing an example of a configuration of a flatbed-type scanner.

FIG. 9 is a perspective view showing an example of the configuration of the flatbed-type scanner.

A scanner 110 includes a housing 111, a platen glass 112 as a part on which an object to be illuminated is mounted, the image sensor unit 10, 60, a drive mechanism that drives the image sensor unit 10, 60, a circuit substrate 113, and a platen cover 114. The platen glass 112 is made up of a transparent plate, such as glass, and is attached onto the upper surface of the housing 111. The platen cover 114 is attached to the housing 111 so as to be openable and closable through a hinge mechanism and to cover the object P to be illuminated mounted on the platen glass 112. The image sensor unit 10, 60, the drive mechanism for driving the image sensor unit 10, 60, and the circuit substrate 113 are housed in the housing 111. The scanner 110 includes the platen glass 112. Consequently, the image sensor unit 10, 60 does not necessarily include the cover body 18. Therefore, the reference members 50, 80 can be attached to positions that are on the lower surface of the platen glass 112 and do not overlap with the object P to be illuminated, for example.

The drive mechanism includes a holding member 115, a guide shaft 116, a drive motor 117, and a wire 118. The holding member 115 holds the image sensor unit 10, 60 so as to surround this unit. The guide shaft 116 guides the holding member 115 along the platen glass 112 so that this member can move in the reading direction (sub-scan direction) along the platen glass 112. The drive motor 117 is coupled to the holding member 115 via the wire 118, and moves the holding member 115, which holds the image sensor unit 10, 60, by a drive force by the drive motor 117. The image sensor unit 10, 60 then reads an original that is the object P to be illuminated mounted on the platen glass 112 while being moved in the sub-scan direction by the drive force of the drive motor 117. As described above, while the image sensor unit 10, 60 and the object P to be illuminated are moved relatively to each other, the image sensor unit 10, 60 reads the object P to be illuminated.

An image processing circuit that applies a predetermined image processing to an image read by the image sensor unit 10, 60, a control circuit that controls each part of the scanner 110 that includes the image sensor unit 10, 60, and a power source circuit that supplies electric power to each part of the scanner 110 are constructed on the circuit substrate 113.

Fourth Embodiment

Next, a configuration where the above-described image sensor unit 10, 60 is applied to a sheetfeed-type scanner as an image reading apparatus is described with reference to FIG. 10.

Figure 10:
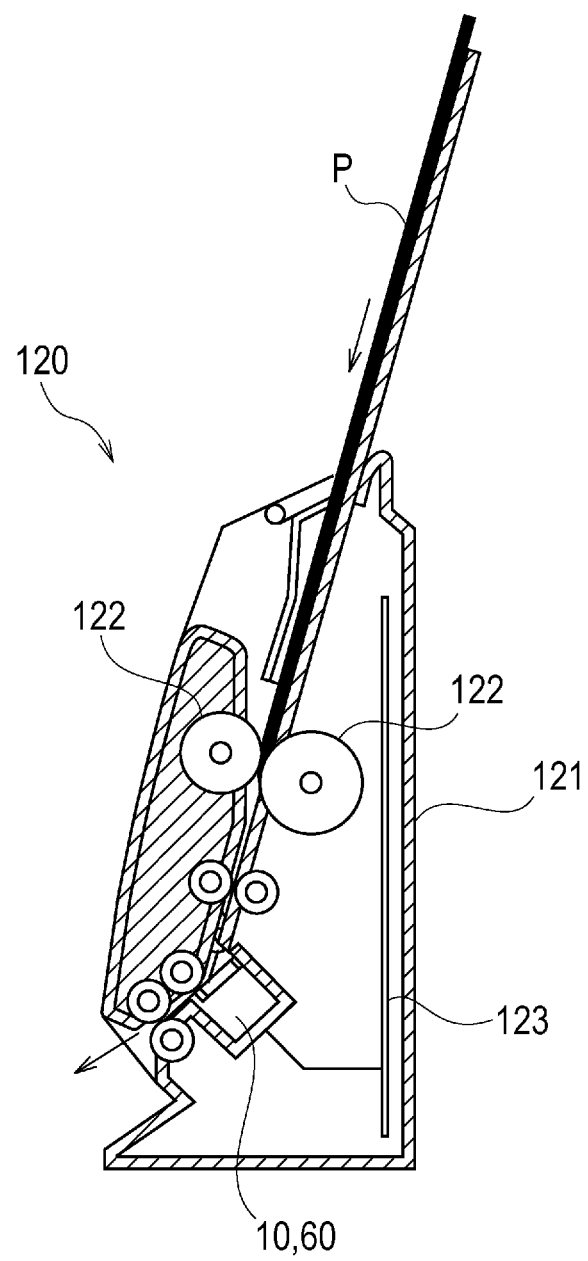
FIG. 10 is a sectional view showing an example of a configuration of a sheetfeed-type scanner.

FIG. 10 is a sectional view showing an example of the configuration of the sheetfeed-type scanner.

The scanner 120 includes a housing 121, the image sensor unit 10, 60, conveyor rollers 122, and a circuit substrate 123. The conveyor roller 122 is rotated by a drive mechanism, which is not shown, and conveys the object P to be illuminated while clamping this object. A control circuit that controls each part of the scanner 120 that includes the image sensor unit 10, 60, and a power source circuit that supplies electric power to each part of the scanner 120 are constructed on the circuit substrate 123.

The scanner 120 then causes the image sensor unit 10, 60 to read the object P to be illuminated while causing the conveyor rollers 122 to convey the object P to be illuminated in the reading direction (sub-scan direction). That is, while the image sensor unit 10, 60 and the object P to be illuminated are moved relatively to each other, the image sensor unit 10, 60 reads the object P to be illuminated. FIG. 10 shows the example of the scanner 120 that reads one surface of the object P to be illuminated. Alternatively, a configuration may be adopted where two image sensor units 10, 60 are provided to face each other with a conveyance path for the object P to be illuminated intervening therebetween, and read the both surfaces of the object P to be illuminated.

Fifth Embodiment

Next, a configuration where the above-described image sensor unit 10, 60 is applied to an image forming apparatus is described with reference to FIGS. 11 and 12.

Figure 11:
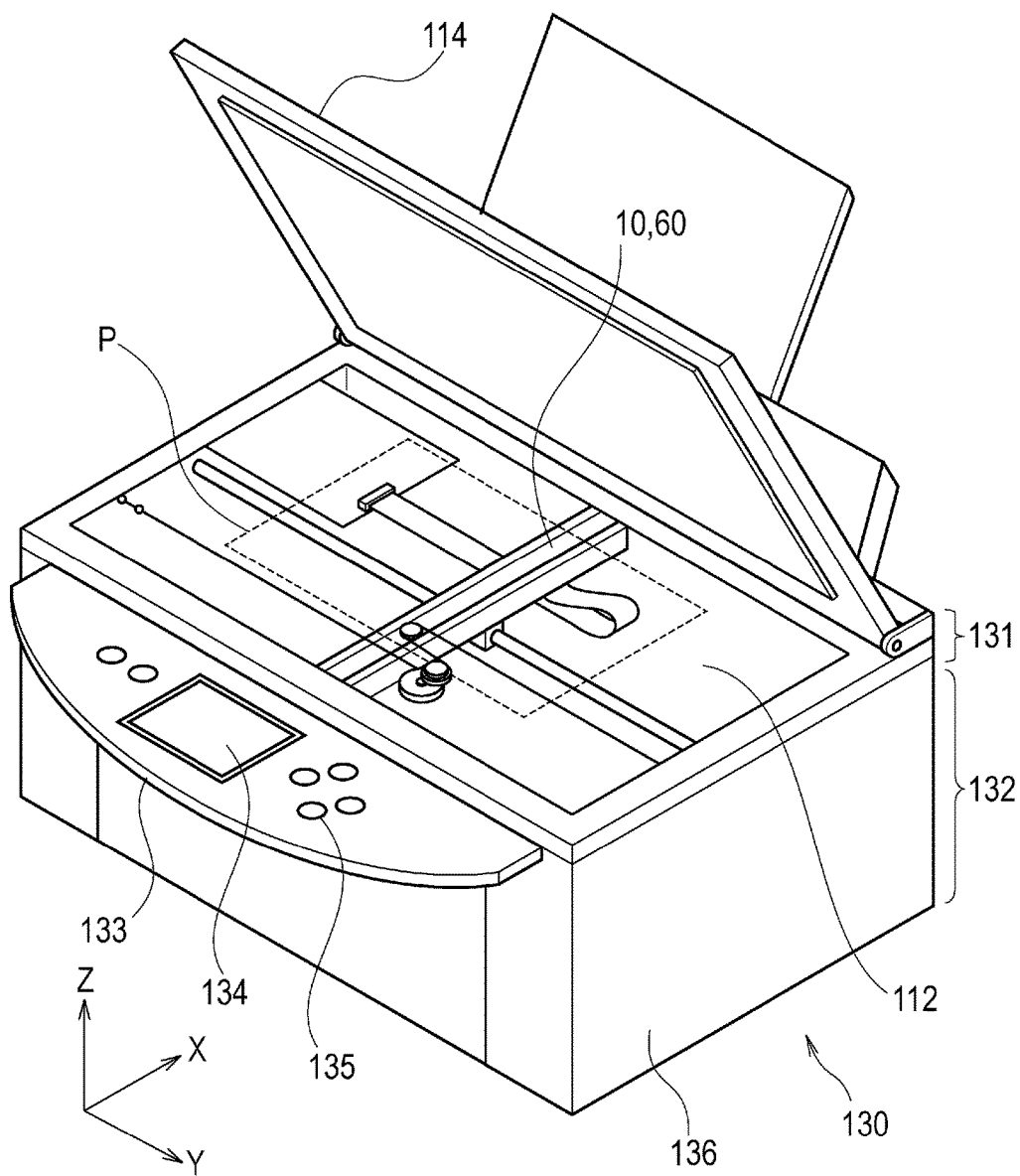
FIG. 11 is a perspective view showing an appearance of an image forming apparatus.

FIG. 11 is a perspective view illustrating an appearance of the image forming apparatus. FIG. 12 is a perspective view showing an image forming part provided in a housing of the image forming apparatus in a manner where this part is extracted.

The image forming apparatus 130 is a multifunction printer (MFP) in which a flatbed-type scanner and an inkjet-type printer are combined. The image forming apparatus 130 includes an image reading part 131 as image reading means for reading an image, and an image forming part 132 as image forming means for forming an image. The image sensor unit 10, 60 is installed in the image reading part 131 of the image forming apparatus 130. The configuration common to that of the above-described image reading apparatus can be applied to the image reading part 131 of the image forming apparatus 130. Consequently, description of configuration elements common to those of the image reading apparatus is omitted.

As shown in FIG. 11, the image forming apparatus 130 includes an operation part 133. The operation part 133 includes a display part 134 that displays an operation menu and various messages, and various operation buttons 135 for operation for the image forming apparatus 130. As shown in FIG. 12, the image forming part 132 is provided in the housing 136 of the image forming apparatus 130. The image forming part 132 includes conveyor rollers 137, a guide shaft 138, an inkjet cartridge 139, a motor 140, and a pair of timing pulleys 141. The conveyor rollers 137 are rotated by the drive force of a drive source to convey a printer sheet R as a recording medium in the sub-scan direction. The guide shaft 138 is a member having a rod shape, and is fixed to the housing 136 of the image forming apparatus 130 so that its axis can be parallel to the main-scan direction of the printer sheet R.

The inkjet cartridge 139 can move to and fro in the main-scan direction of the printer sheet R by sliding along the guide shaft 138. The inkjet cartridge 139 includes, for example, ink tanks 142 (142C, 142M, 142Y and 142K) that contain cyan C, magenta M, yellow Y, and black K inks, and discharge heads 143 (143C, 143M, 143Y and 143K) provided for the respective ink tanks 142. One of the pair of the timing pulleys 141 are attached to a rotation shaft of the motor 140. The pair of timing pulleys 141 are provided at positions apart from each other in the main-scan direction of the printer sheet R. A timing belt 144 is wound around the pair of timing pulleys 141 in a manner of being wound parallel, and a predetermined point of this belt is coupled to the inkjet cartridge 139.

The image reading part 131 of the image forming apparatus 130 converts an image read by the image sensor unit 10, 60 into an electric signal in a format suitable to printing. The image forming part 132 of the image forming apparatus 130 drives the conveyor rollers 137, the motor 140 and the inkjet cartridges 139, and forms an image on the printer sheet R on the basis of the electric signal converted by the image sensor unit 10, 60 of the image reading part 131. The image forming part 132 of the image forming apparatus 130 can form an image on the basis of an electric signal input from the outside. The image forming part 132 in the image forming apparatus 130 may have the same configuration and operation as various conventionally, publicly known printers have. Accordingly, the detailed description is omitted. The inkjet-type image forming apparatus has been described as the image forming part 132. Alternatively, any of the electronic photograph, thermal transfer, and dot impact types may be adopted.

Although preferred embodiments of the present invention have been described above, the present invention is not limited to these embodiments, and various modifications and alterations can be made without departing from the spirit of the present invention.

In the above-described first and second embodiments, the cases where the illuminance storing circuit 41, the illuminance comparing circuit 42 and the drive circuit 43 are mounted on the sensor substrate 38 have been described. However, the present invention is not limited to such cases. That is, at least any one of the illuminance storing circuit 41, the illuminance comparing circuit 42 and the drive circuit 43 may be in the image reading apparatus 100 but be configured separately from the image sensor unit 10, 60.

In the above-described first and second embodiments, the cases that each include two reference members 50, 80 arranged have been described. However, the present invention is not limited to such cases. Alternatively, three or more members may be disposed. Conversely, only one member may be disposed outside of the effective reading range E.

In the above-described first and second embodiments, the cases where the drive circuit 43 causes the light source part 25 to emit light actually and the detected irradiation intensity is stored as the reference irradiation intensity in the illuminance storing circuit 41 before the image sensor unit 10, 60 is shipped have been described. However, the present invention is not limited to such cases. That is, an irradiation intensity obtained through experiences or calculation without actual light emission may be stored as the reference irradiation intensity in the illuminance storing circuit 41.

In the above-described first and second embodiments, the case of including the light source part 25 where the plurality of light sources 26 are implemented on the light source substrate 30 in the main-scan direction has been described. However, the present invention is not limited to such cases. Alternatively, any configuration may be adopted only if the configuration emits at least a line of ultraviolet light in the main-scan direction onto the bill S. For example, a light source part may be adopted that includes a light guide having a longitudinal form in the main-scan direction, and a light source disposed at an end surface of the light guide.

In the above-described first and second embodiments, the cases where the image sensor unit 10 is disposed below the conveyance path of the bill S have been described. However, the present invention is not limited to such cases. Alternatively, as indicated by the chain double-dashed line in FIG. 1, the image sensor unit 10 may be disposed on the upper side. The image sensor units 10 may be disposed on the upper and lower sides intervened by the conveyance path. Arrangement of the image sensor units 10 intervened by the conveyance path enables the both sides of the bill S to be read in one conveyance.

INDUSTRIAL APPLICABILITY

The present invention can be applied to an image sensor unit, an image reading apparatus, an image forming apparatus, and a paper sheet distinguishing apparatus.

The invention claimed is:

1. A photoelectric conversion apparatus comprising:
   a first photoelectric conversion element that includes a plurality of light receiving elements arranged along a main-scan direction and receives light reflected by an object;
   a reference portion that receives light from a light source configured to emit light having a wavelength in an ultraviolet region and converts the light into fluorescent light having a wavelength different from the wavelength in the ultraviolet region;
   a second photoelectric conversion element that receives the fluorescent light from the reference portion;
   a light condenser that focuses the light reflected by the object, which is illuminated with the light from the light source, on the first photoelectric conversion element; and
   a filter that cuts off light having the wavelength in the ultraviolet region, wherein the filter includes a first region disposed on an optical path of the reflected light emitted from the object to the first photoelectric conversion element, and a second region disposed on an optical path of the fluorescent light emitted from the reference portion to the second photoelectric conversion element, and both the first region and the second region cut off the light having the wavelength in the ultraviolet region.

2. The photoelectric conversion apparatus according to claim 1, wherein the first region and the second region have the same configuration.

3. The photoelectric conversion apparatus according to claim 1, wherein the filter has a larger area than a region for transmitting the reflected light emitted from the object to the first photoelectric conversion element.

4. The photoelectric conversion apparatus according to claim 1, wherein the reference portion and the second photoelectric conversion element are disposed outside of the optical path from the object to the first photoelectric conversion element.

5. The photoelectric conversion apparatus according to claim 1, wherein the reference portion is disposed at a position offset from the optical path of the reflected light emitted from the object to the first photoelectric conversion element in the main-scan direction.

6. The photoelectric conversion apparatus according to claim 1, further comprising:
a transparent cover glass disposed between the object and the light condenser; and
a holder that holds the cover glass.

7. The photoelectric conversion apparatus according to claim 6, wherein a length of the cover glass in the main-scan direction exceeds a length of the filter in the main-scan direction.

8. The photoelectric conversion apparatus according to claim 6, wherein the reference portion is arranged on the holder.

9. The photoelectric conversion apparatus according to claim 8, wherein the reference portion is arranged on a surface of the holder facing the light condenser.

10. The photoelectric conversion apparatus according to claim 1, wherein irradiation intensity of light emitted from the light source is corrected based on an electric signal obtained by the second photoelectric conversion element.

11. The photoelectric conversion apparatus according to claim 1, further comprising:
an image forming part configured to form an image based on an electric signal obtained by the first photoelectric conversion element.

12. A distinguishing apparatus comprising:
a storing part that stores reference data;
a first photoelectric conversion element that includes a plurality of light receiving elements arranged along a main-scan direction and receives light reflected by an object;
a reference portion that receives light from a light source configured to emit light having a wavelength in an ultraviolet region and converts the light into fluorescent light having a wavelength different from the wavelength in the ultraviolet region;
a second photoelectric conversion element that receives the fluorescent light from the reference portion;
a light condenser that focuses the light reflected by the object, which is illuminated with the light from the light source, on the first photoelectric conversion element;
a filter that cuts off light having the wavelength in the ultraviolet region; and a comparing part that compares information based on electric signals outputted from the plurality of light receiving elements of the first photoelectric conversion element and the reference data, wherein
the filter includes a first region disposed on an optical path of the reflected light emitted from the object to the first photoelectric conversion element, and a second region disposed on an optical path of the fluorescent light emitted from the reference portion to the second photoelectric conversion element, and
both the first region and the second region cut off the light having the wavelength in the ultraviolet region.

13. A photoelectric conversion apparatus comprising:
a first photoelectric conversion element that includes a plurality of light receiving elements arranged along a main-scan direction and receives light reflected by an object;
a reference portion that reflects light from a light source configured to emit light having a wavelength in an ultraviolet region;
a second photoelectric conversion element that receives the light reflected by the reference portion;
a light condenser that focuses the light reflected by the object, which is illuminated with the light from the light source, on the first photoelectric conversion element; and
a filter that includes a first region disposed on an optical path of the light emitted from the object to the first photoelectric conversion element and configured to cut off the light having the wavelength in the ultraviolet region, and a second region disposed on an optical path of the light emitted from the reference portion to the second photoelectric conversion element and configured to allow the light having the wavelength in the ultraviolet region to transmit therethrough,
wherein the reference portion reflects the light from the light source at a position different from a position of the object.

14. The photoelectric conversion apparatus according to claim 13, wherein the first region and the second region are disposed on the same plane.

15. The photoelectric conversion apparatus according to claim 13, further comprising an image forming part configured to form an image based on an electric signal obtained by the first photoelectric conversion element.

16. A distinguishing apparatus comprising:
a storing part that stores reference data;
a first photoelectric conversion element that includes a plurality of light receiving elements arranged along a main-scan direction and receives light reflected by an object;
a reference portion that reflects light from a light source configured to emit light having a wavelength in an ultraviolet region;
a second photoelectric conversion element that receives the light reflected by the reference portion;
a light condenser that focuses the light reflected by the object, which is illuminated with the light from the light source, on the first photoelectric conversion element;
a filter that includes a first region disposed on an optical path of the light emitted from the object to the first photoelectric conversion element and configured to cut off the light having the wavelength in the ultraviolet region, and a second region disposed on an optical path of the light emitted from the reference portion to the second photoelectric conversion element and configured to allow the light having the wavelength in the ultraviolet region to transmit therethrough; and a comparing part that compares information based on electric signals outputted from the plurality of light receiving elements of the first photoelectric conversion element and the reference data, wherein the reference portion reflects the light from the light source at a position different from a position of the object.

* * * * *